United States Patent Office 2,706,502
Patented Apr. 19, 1955

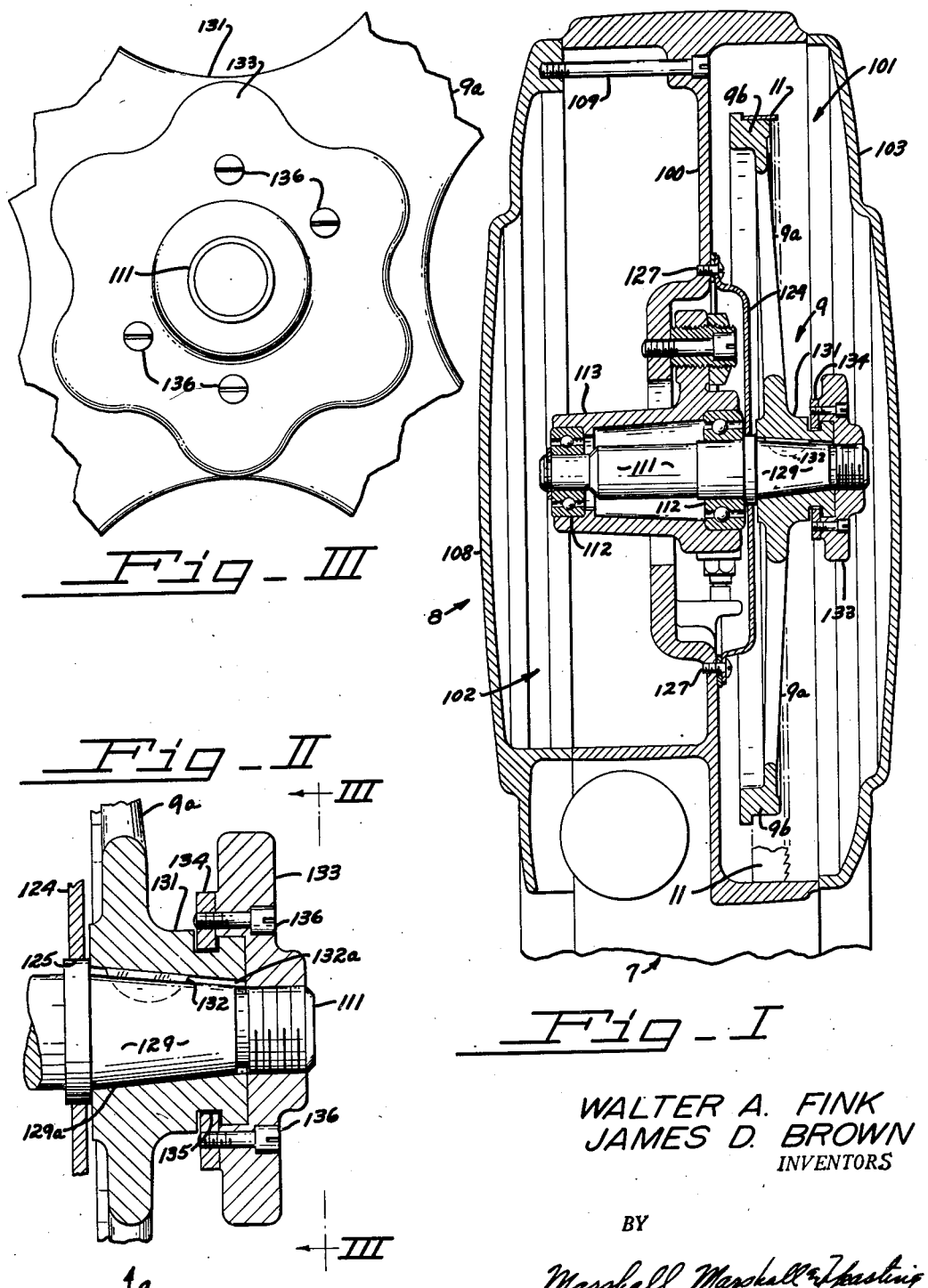

2,706,502

COMBINATION WHEEL RETAINER AND PULLER

Walter A. Fink and James D. Brown, Toledo, Ohio, assignors to Toledo Scale Company, Toledo, Ohio, a corporation of New Jersey Application April 21, 1952, Serial No. 283,447

2 Claims. (Cl. 143—30)

This invention relates to meat cutting band saws of the type having a saw blade which passes over a plurality of pulleys, and particularly to improved means for mounting and dismounting such pulleys.

This application is a division of our copending application Serial No. 770,247, filed August 23, 1947, now Patent No. 2,617,451.

The principal object of this invention is to provide improved means for installing and removing the pulleys of a band saw.

Other objects and advantages will be apparent from the following description, in which reference is had to the accompanying drawings illustrating a preferred form of the invention.

According to the invention, a saw blade pulley is mounted on and keyed to a rotatable shaft. Threaded on one end of the shaft is a hand nut which retains the pulley on the shaft. A split ring coaxially attached to the hand nut is freely engaged in an annular groove in the hub of the pulley. During removal of the pulley from the shaft as the hand nut is loosened, the split ring engages an edge of the groove in the hub of the pulley and pulls the pulley from its seat on the shaft.

In the drawings:

Figure I (which corresponds to Figure XII of our copending application) is a cross-sectional view of the head of a meat cutting band saw embodying the invention.

Figure II is an enlarged view of the pulley mounting shown in Figure I, parts being broken away.

Figure III is a fragmentary elevation as seen from the line III—III of Figure II.

A machine embodying the instant invention has an upper housing which consists of a column 7 erected at the rear center portion of a base housing (not shown) and a head 8 formed at the top of the column 7. The head 8 is substantially I-shaped in vertical cross section to form a first or pulley compartment 101 for housing an upper saw wheel or pulley 9, and a second or bearing compartment 102 for housing adjustable means for journaling a rotatable shaft 111.

A door 103 hingedly supported on the column 7 closes the pulley compartment 101. The second compartment 102 is closed by a panel 108 removably attached to the head 8 by means of a plurality of retaining screws 109.

Adjustably mounted through a center wall 100 of the head 8 and lying partially in each of the compartments 101 and 102 is a tubular casting 113 in which is mounted a pair of anti-friction bearings 112 for rotatably supporting the shaft 111. That end of the casting 113 projecting into the compartment 101 is shielded by a pan-shaped cover 124 which has a centrally located opening 125 to permit the shaft 111 to pass through the cover and into the compartment 101. The cover 124 is secured to the wall 100 by a plurality of screws 127.

A hub 131 of the pulley 9 has a tapered bore or opening 129a to permit its being placed on a tapered portion 129 of the shaft 111. A Woodruff key 132 seated in the tapered portion 129 of the shaft 111 engages in a keyway 132a milled in the bore 129a of the hub 131 to prevent rotation of the pulley 9 on the shaft 111.

The pulley 9 is of the general type having spokes 9a extending radially from the hub 131 to support a rim 9b around which a saw blade 11 passes. A hand nut 133 is threaded on the end of the shaft 111 to prevent the pulley from moving axially.

Coaxial with the hand nut 133 and removably attached thereto by a plurality of screws 136 is an annular split ring 134 which engages freely in an annular groove 135 in the hub 131 of the pulley. The split ring acts to withdraw the pulley from its seat on the shaft as the hand nut is loosened.

Operation

To remove the pulley 9 from the machine, the operator, after opening the door 103 and removing the saw blade, unscrews the hand nut 133 while holding the pulley from turning. Since the pulley hub 131 is keyed to the shaft 111 the shaft cannot twist in the hub and turn with the hand nut. After a part turn of the hand nut 133 the split ring 134 tightens against the side of the groove 135 in the pulley hub 131 and further rotation of the nut 133 relative to the shaft 111 draws the hub 131 from its seat on the tapered portion 129 of the shaft so that it may be easily removed.

In replacing the cleaned pulley, the bore 129a of the hub 131 is started on the tapered section 129 of the shaft and the keyway engaged with the key 132. The pulley is held while the hand nut 133 is being tightened to prevent rotation of the shaft. The blade is then replaced on the pulley and the machine is again ready for operation.

Various changes may be made in the details of construction and in the combination and arrangement of the several parts within the scope of the claims without departing from the spirit of the invention.

Having described the invention, we claim:

1. A dual functioning wheel retainer and wheel puller comprising, in combination, a shaft having a seat, a wheel hub seated on said shaft, said shaft having a threaded end extending beyond the portion on which the wheel hub is seated, a nut threaded on said threaded portion of the shaft for retaining the wheel hub on the shaft, said hub having an annular groove in its periphery, and a split ring fixed to the nut and coaxial therewith, said ring being engaged in the groove in the hub to cause withdrawal of the wheel hub axially from the shaft as said nut is removed therefrom.

2. A dual functioning wheel retainer and wheel puller comprising, in combination, a shaft, a wheel hub seated on a portion of said shaft, said shaft having a threaded end extending beyond the portion on which the hub is seated, a retainer nut threaded on said shaft and engaging said hub to prevent said hub from moving axially during normal operation of said hub, means for preventing rotation of said hub relative to said shaft, said hub having an annular groove concentric with the shaft, and means on said nut engaging freely in said annular groove during the normal operation of said hub and engaging positively in said annular groove during removal of the hub from said shaft so as to cause withdrawal of the hub axially from the shaft as said nut is removed therefrom.

References Cited in the file of this patent

UNITED STATES PATENTS

| | | |
|---|---|---|
| 1,417,265 | McClarran | May 23, 1922 |
| 2,030,006 | Kelly | Feb. 4, 1936 |